(12) United States Patent
Lin

(10) Patent No.: US 7,357,102 B1
(45) Date of Patent: Apr. 15, 2008

(54) SYSTEM FOR GENERATING HYBRID FUEL FOR A COMBUSTION ENGINE

(76) Inventor: Wen-Chang Lin, No. 14, Alley 14, Lane 376, Hsi-Chou 1st Rd., Hsi-Chou Tsun, Lin-Yuan Hsiang, Kaohsiung Hsien (TW)

( * ) Notice: Subject to any disclaimer, the term of this patent is extended or adjusted under 35 U.S.C. 154(b) by 0 days.

(21) Appl. No.: 11/593,533

(22) Filed: Nov. 7, 2006

(51) Int. Cl.
   *F02B 75/12* (2006.01)
(52) U.S. Cl. .......................... 123/1 A; 204/266; 123/3; 123/575
(58) Field of Classification Search ................. 123/1 A, 123/3, 575, DIG. 12; 204/266, 275.1, 278
   See application file for complete search history.

(56) References Cited

U.S. PATENT DOCUMENTS

| | | | |
|---|---|---|---|
| 1,379,077 A | * | 5/1921 | Blumenberg, Jr. .......... 123/537 |
| 4,077,367 A | * | 3/1978 | Steiger .......................... 123/23 |
| 4,429,675 A | * | 2/1984 | Talbert ........................ 123/558 |
| 7,021,050 B2 | * | 4/2006 | Nishimura et al. ........... 60/295 |
| 7,021,249 B1 | | 4/2006 | Christison |

* cited by examiner

*Primary Examiner*—Katrina B. Harris
(74) *Attorney, Agent, or Firm*—Ladas & Parry LLP

(57) ABSTRACT

A system includes: an electrolytic cell for electrolytically converting water into a oxyhydrogen gas, the electrolytic cell having a gas outlet port; a fuel tank defining a fuel chamber therein and adapted to store hydrocarbon fuel in the fuel chamber in such a manner that the fuel chamber is divided by a body of the hydrocarbon fuel in the fuel tank into a liquid fuel-filled portion and a liquid fuel-free portion above the liquid fuel-filled portion, the fuel tank having upper and lower inlet ports; and a gas distributing unit including a control valve connected to the gas outlet port of the electrolytic cell and the upper and lower inlet ports of the fuel tank so as to direct first and second streams of the oxyhydrogen gas into the liquid fuel-free portion and the liquid fuel-filled portion of the fuel chamber, respectively.

6 Claims, 2 Drawing Sheets

SYSTEM FOR GENERATING HYBRID FUEL FOR A COMBUSTION ENGINE

BACKGROUND OF THE INVENTION

1. Field of the Invention

This invention relates to a system for generating hybrid fuel for a combustion engine, more particularly to a system including an electrolytic cell coupled to a fuel tank for generating hybrid fuel for a combustion engine.

2. Description of the Related Art

U.S. Pat. No. 7,021,249 discloses a conventional system for generating a hydrogen-enriched fuel for an engine. The system includes a hydrogen generator with an electrolyte tank for generating a hydrogen gas and an oxygen gas in the electrolyte tank, and delivery means for delivering hydrocarbon fuel and the generated hydrogen from the electrolyte tank into a venturi mixing tube which is directly connected to a carburetor of the engine. The delivery means includes a fuel pump for delivering the hydrocarbon fuel to the venturi mixing tube. The generated oxygen gas is vented from the electrolyte tank. Hydrogen production is regulated by a rheostat. Digital flow control and data acquisition processors are provided to regulate and monitor the mixture ratio of the generated hydrogen and the hydrocarbon fuel to the carburetor.

The aforesaid conventional system is disadvantageous in that a specific venturi mixing tube is required for mixing the hydrogen gas and the hydrocarbon fuel and that the generated oxygen gas is vented and is not introduced into the engine for assisting the combustion. Moreover, means for controlling and monitoring the ratio of the hydrogen gas to the hydrocarbon fuel is complicated.

SUMMARY OF THE INVENTION

The object of the present invention is to provide a system for generating hybrid fuel for a combustion engine that can overcome the aforesaid drawbacks of the prior art.

According to this invention, there is provided a system for generating hybrid fuel for a combustion engine. The system comprises: an electrolytic cell for electrolytically converting water into a oxyhydrogen gas, the electrolytic cell having a gas outlet port; a fuel tank defining a fuel chamber therein and adapted to store hydrocarbon fuel in the fuel chamber in such a manner that the fuel chamber is divided by a body of the hydrocarbon fuel in the fuel tank into a liquid fuel-filled portion and a liquid fuel-free portion above the liquid fuel-filled portion, the fuel tank having an upper inlet port that is in fluid communication with the liquid fuel-free portion, and a lower inlet port that is in fluid communication with the liquid fuel-filled portion; and a gas distributing unit including a control valve connected to the gas outlet port of the electrolytic cell for dividing the oxyhydrogen gas generated by the electrolytic cell into first and second streams. The control valve is further connected to the upper and lower inlet ports of the fuel tank so as to direct the first and second streams of the oxyhydrogen gas into the liquid fuel-free portion and the liquid fuel-filled portion of the fuel chamber through the upper and lower inlet ports, respectively.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
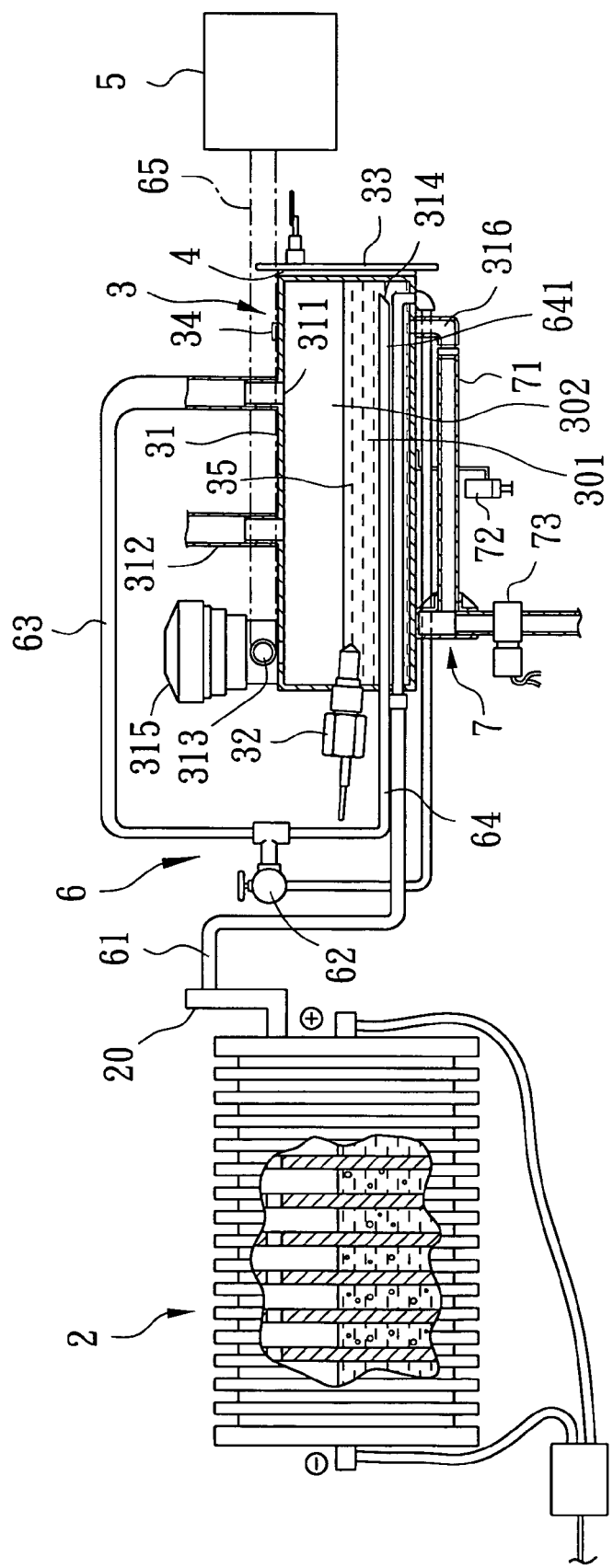
FIG. 1 is a schematic view of the preferred embodiment of a system for generating hybrid fuel for a combustion chamber according to this invention.
Figure 2:
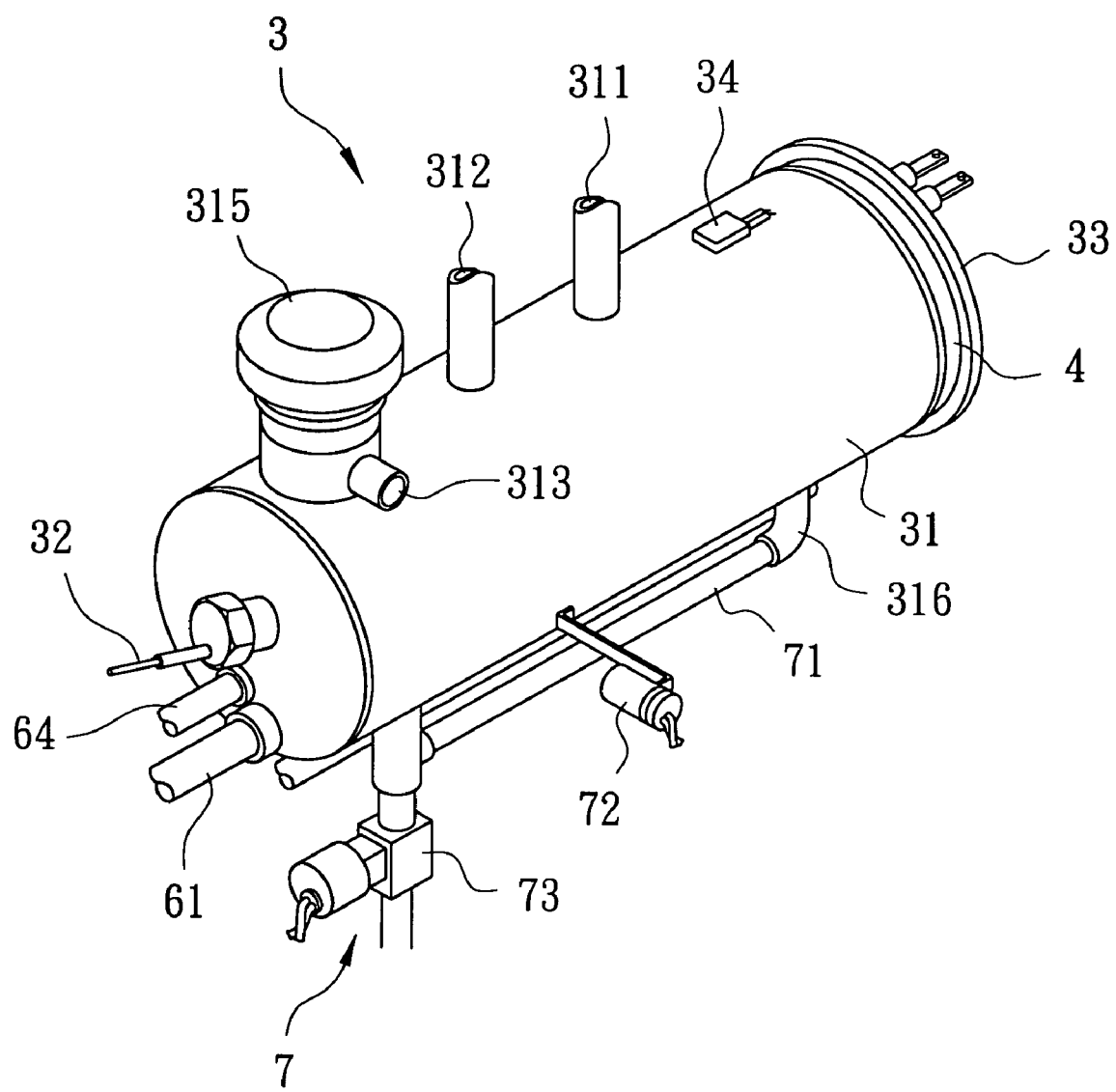
FIG. 2 is a perspective view illustrating the configuration of a fuel tank of the preferred embodiment.

FIGS. 1 and 2 illustrate the preferred embodiment of a system for generating hybrid fuel for a combustion engine according to this invention.

The system includes: an electrolytic cell 2 for electrolytically converting water into a oxyhydrogen gas, the electrolytic cell 2 having a gas outlet port 20; a fuel tank 3 defining a fuel chamber 30 therein and adapted to store hydrocarbon fuel 35 in the fuel chamber 30 in such a manner that the fuel chamber 30 is divided by a body of the hydrocarbon fuel 35 in the fuel tank 3 into a liquid fuel-filled portion 301 and a liquid fuel-free portion 302 above the liquid fuel-filled portion 301, the fuel tank 3 having an upper inlet port 311 that is in fluid communication with the liquid fuel-free portion 302, and a lower inlet port 314 that is in fluid communication with the liquid fuel-filled portion 301; and a gas distributing unit 6 including a control valve 62 connected to the gas outlet port 20 of the electrolytic cell 2 for dividing the oxyhydrogen gas generated by the electrolytic cell 2 into first and second streams. The control valve 62 is further connected to the upper and lower inlet ports 311, 314 of the fuel tank 3 so as to direct the first and second streams of the oxyhydrogen gas into the liquid fuel-free portion 302 and the liquid fuel-filled portion 301 of the fuel chamber 30 through the upper and lower inlet ports 311, 314, respectively.

In this embodiment, the fuel tank 3 is in the form of a cylindrical hollow body 31 disposed horizontally, and is provided with a fuel level detector 32 for detecting a hydrocarbon fuel level in the fuel tank 3, a safety valve 315 for pressure relief in the fuel tank 3, a heater 33 on one end thereof for heating the hydrocarbon fuel 35 in the fuel tank 3 to a suitable working temperature, and a temperature detector 34 for detecting a temperature of the hydrocarbon fuel 35 in the fuel tank 3. An electrical insulator 4 is sandwiched between the fuel tank 3 and the heater 33 for preventing electrical contact between the heater 33 and the fuel tank 3.

Since a small amount of water from the electrolytic cell 2 is carried by the oxyhydrogen gas into the fuel tank 3, removal of the accumulated water from the fuel tank 3 is required when a predetermined water level is detected. Hence, a water draining unit 7 is provided in the system. The water draining unit 7 includes a drain pipe 71 connected to a drain port 316 of the fuel tank 3, a water level detector 72 for detecting a water level in the fuel tank 3, and a drain control valve 73 coupled to the water level detector 72 and the drain pipe 71 so as to drain the accumulated water from the fuel tank 3 when actuated by the water level detector 72 upon detecting a high water level.

A pipeline 6 is provided for delivering the oxyhydrogen gas into the fuel tank 3, and includes a first pipe 61 connected to the gas outlet port 20 of the electrolytic cell 2, extending into the fuel tank 3 through the body of the hydrocarbon fuel 35, and then extending out of the fuel tank 3 to connect with an inlet of the control valve 62. The pipeline 6 further includes a second pipe 63 that is connected to a first outlet of the control valve 62 and the upper inlet port 311 of the fuel tank 3, and a third pipe 64 that is connected to a second outlet of the control valve 62 and that has an end portion 641 extending into the fuel tank 3 through the body of the hydrocarbon fuel 35. The end portion 641 of the third pipe 64 defines the lower inlet port 314 of the fuel tank 3.

The fuel tank 3 further has a fuel inlet port 312 for receiving the hydrocarbon fuel 35 from a fuel supply (not shown), and a fuel gas outlet port 313. The pipeline 6 further includes a fourth pipe 65 that is connected to the fuel gas outlet port 313 and the engine 5.

In operation, the control valve 3 is pre-adjusted so as to control desired flow rates for the first and second streams of the oxyhydrogen gas into the liquid fuel-free portion 302 and the liquid fuel-filled portion 301 of the fuel chamber 30, respectively. The second stream of the oxyhydrogen gas passes through the body of the hydrocarbon fuel 35, carries a corresponding amount of the hydrocarbon fuel vapor into the liquid fuel-free portion 302 of the fuel chamber 30, and is subsequently mixed with the first stream of the oxyhydrogen gas, thereby forming the hybrid fuel to be injected into the combustion engine 5. The higher the flow rate of the second stream of the oxyhydrogen gas, the higher will be the amount of the hydrocarbon fuel vapor carried by the second stream of the oxyhydrogen gas.

Since the hybrid fuel generated by the system of this invention contains a considerable amount of oxygen, combustion of the hybrid fuel can be greatly enhanced and the amount of carbon monoxide (CO) generated during combustion of the combustion engine 5 can be significantly reduced. Moreover, the system of this invention is dispensed with the venturi mixing tube of the aforesaid conventional system, and is relatively simple and cost effective.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A system for generating hybrid fuel for a combustion engine, comprising:

an electrolytic cell for electrolytically converting water into a oxyhydrogen gas, said electrolytic cell having a gas outlet port;

a fuel tank defining a fuel chamber therein and adapted to store hydrocarbon fuel in said fuel chamber in such a manner that said fuel chamber is divided by a body of the hydrocarbon fuel in said fuel tank into a liquid fuel-filled portion and a liquid fuel-free portion above said liquid fuel-filled portion, said fuel tank having an upper inlet port that is in fluid communication with said liquid fuel-free portion, and a lower inlet port that is in fluid communication with said liquid fuel-filled portion; and a gas distributing unit including a control valve connected to said gas outlet port of said electrolytic cell for dividing the oxyhydrogen gas generated by said electrolytic cell into first and second streams, said control valve being further connected to said upper and lower inlet ports of said fuel tank so as to direct the first and second streams of the oxyhydrogen gas into said liquid fuel-free portion and said liquid fuel-filled portion of said fuel chamber through said upper and lower inlet ports, respectively;

wherein said fuel tank further has a drain port, said system further comprising a water draining unit that includes a drain pipe connected to said drain port of said fuel tank, a water level detector for detecting a water level in said fuel tank, and a drain control valve coupled to said water level detector and said drain pipe so as to drain accumulated water from said fuel tank.

2. The system of claim 1, wherein said fuel tank is provided with a fuel level detector for detecting a hydrocarbon fuel level in said fuel tank.

3. The system of claim 1, wherein said fuel tank is provided with a safety valve.

4. The system of claim 1, wherein said fuel tank is provided with a heater for heating the hydrocarbon fuel in said fuel tank.

5. The system of claim 4, wherein said fuel tank is provided with a temperature detector for detecting a temperature of the hydrocarbon fuel in said fuel tank.

6. The system of claim 4, further comprising an electrical insulator sandwiched between said fuel tank and said heater.

* * * * *